(12) United States Patent
Lambeth

(10) Patent No.: US 12,467,780 B2
(45) Date of Patent: Nov. 11, 2025

(54) LOAD WEIGHING LUGGAGE RACK

(71) Applicant: Bruce M. Lambeth, Redlands, CA (US)

(72) Inventor: Bruce M. Lambeth, Redlands, CA (US)

( * ) Notice: Subject to any disclaimer, the term of this patent is extended or adjusted under 35 U.S.C. 154(b) by 381 days.

(21) Appl. No.: 18/194,244

(22) Filed: Mar. 31, 2023

(65) Prior Publication Data

US 2023/0236062 A1    Jul. 27, 2023

Related U.S. Application Data

(63) Continuation-in-part of application No. 16/403,006, filed on May 3, 2019, now abandoned.

(51) Int. Cl.
| | | |
|---|---|---|
| *G01G 19/52* | (2006.01) | |
| *G01G 21/22* | (2006.01) | |
| *G01G 23/36* | (2006.01) | |

(52) U.S. Cl.
CPC ............ *G01G 19/52* (2013.01); *G01G 21/22* (2013.01); *G01G 23/36* (2013.01)

(58) Field of Classification Search
CPC ........ G01G 19/52; G01G 19/58; G01G 21/28; G01G 23/3735; G01G 21/23; G01G 21/22
See application file for complete search history.

(56) References Cited

U.S. PATENT DOCUMENTS

| | | | |
|---|---|---|---|
| 2,147,201 | A | 2/1939 | Klayman |
| 4,503,782 | A | 3/1985 | Helton |
| 5,319,817 | A | 6/1994 | Hay et al. |
| 5,511,571 | A | 4/1996 | Adrezin et al. |
| D451,304 | S | 12/2001 | Felsenthal |
| 6,661,341 | B2 | 12/2003 | Masuda et al. |
| 6,849,808 | B2 | 2/2005 | Enomoto et al. |
| 7,156,918 | B2 | 1/2007 | Marks |
| 7,629,542 | B1 | 12/2009 | Harding et al. |
| 8,485,329 | B1 | 7/2013 | Roy et al. |
| 8,853,565 | B2 | 10/2014 | Kritzler |
| 9,804,018 | B1 | 10/2017 | Muccillo |
| 2005/0051586 | A1 | 3/2005 | Siwak et al. |
| 2007/0056779 | A1 | 3/2007 | Aniado et al. |
| 2008/0035391 | A1 | 2/2008 | Jewett et al. |
| 2010/0181354 | A1 | 7/2010 | Laniado |
| 2017/0227395 | A1 | 8/2017 | Esmail et al. |
| 2022/0221331 | A1 | 7/2022 | Smith et al. |

FOREIGN PATENT DOCUMENTS

CN    103308135 A    9/2013

*Primary Examiner* — Randy W Gibson
(74) *Attorney, Agent, or Firm* — CIONCA IP Law P.C.

(57) ABSTRACT

A load weighing luggage rack having a first top rail and a second top rail, wherein each top rail is comprised of a rail base, a pair of load sensors configured to be seated on the rail base and a top platform configured to be seated on top of each corresponding load sensor and the rail base, such that each load sensor is nested within a corresponding top rail, a plurality of straps configured to engage with the first and second top rails and a strain meter in electrical communication with each load sensor, such that a weight exerted on each load sensor may be measured and displayed by the strain meter. Each top rail may be supported by a corresponding rail support, wherein the rail supports may be configured to allow for selective folding of the load weighing luggage rack to facilitate easy storage and transit.

20 Claims, 8 Drawing Sheets

LOAD WEIGHING LUGGAGE RACK

CROSS-REFERENCE TO RELATED APPLICATIONS

This application claims the benefit of U.S. application Ser. No. 16/403,006, filed May 3, 2019, which is hereby incorporated by reference, to the extent that it is not conflicting with the present application.

BACKGROUND OF INVENTION

1. Field of the Invention

The invention relates generally to luggage accessories, and more specifically to luggage racks configured to weigh luggage

2. Description of the Related Art

A modern traveler can be expected to have packages containing clothing, toiletries, small possessions, trip necessities, and on the return trips, souvenirs and the like, which are often stored in a type of luggage container for convenience. In order to prepare a luggage container to allow it to be transported alongside a traveler, it is often necessary to determine weight of said luggage prior to loading it on to a vehicle. This may present a challenge to travelers who have obtained additional items during a trip, as this may increase the weight of their luggage container beyond a weight limit. While luggage weighing devices may be available at a transit hub, such as an airport, said devices would require a user to reorganize, and adjust their luggage containers at the transit hub, thus being highly inconvenient or potentially impossible, depending on the environment. Luggage racks, and other luggage supporting devices, are often used to support and store luggage before, during and after transit. While conventional luggage racks may help provide support for a user's luggage transit, thus keeping the user's luggage secure and off of the ground, said luggage rack may not be capable of alleviating the indeterminate weight issue identified above.

While some devices may be configured to allow a user to weigh a piece of luggage or other item, said devices have notable shortcomings that may limit their usefulness or viability. Some luggage racks may utilize a solid platform to measure the weight of an object placed on the platform, but such a luggage rack would be overly bulky and thus storage and transportation of said luggage rack may become difficult. Alternative luggage racks may utilize sensors within the legs of the luggage racks, but such positioning may limit the quantity of sensors used and require that at the rack has a sensor within each leg to accurately measure the weight held luggage.

Therefore, there is a need to solve the problems described above by proving a luggage rack that is configured to simultaneously support and weigh luggage, while being convenient to use, carry and store alongside said luggage.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a load weighing luggage rack is provided, the load weighing luggage rack comprising: a first leg having a first leg top and a first leg middle; a second leg having a second leg top and a second leg middle; a third leg having a third leg top and a third leg middle; a fourth leg having a fourth leg top and a fourth leg middle; a first top rail having a first end configured to engage with the first leg top and a second end configured to engage with the second leg top, the first top rail comprising: a first pair of load sensors; a first rail base configured to engage with the first pair of load sensors, the first rail base comprising: a first rail base body having a top portion; a first wire chamber nested within the first rail base body, wherein the first wire chamber is configured to securely house a corresponding portion of a sensor wire; a first sensor cavity nested within the top portion of the first rail base body, wherein the first sensor cavity is disposed above and associated with the first wire chamber and the first sensor cavity is configured to securely seat the first pair of load sensors, such that each load sensor of the first pair of load sensors is in electrical communication with the sensor wire; a first top platform having a first top surface, the first top platform being configured to be seated on and nested around each load sensor of the first pair of load sensors and the top portion of the first rail base body, such that a corresponding weight applied to the first top surface is exerted upon the first pair of load sensors; a second top rail having a first end configured to engage with the third leg top and a second end configured to engage with the fourth leg top, the second top rail comprising: a second pair of load sensors; a second rail base configured to engage with the second pair of load sensors, the second rail base comprising: a second rail base body having a top portion; a second wire chamber nested within the second rail base body, wherein the second wire chamber is configured to securely house a corresponding portion of the sensor wire; a second sensor cavity nested within the top portion of the second rail base body, wherein the second sensor cavity is disposed above and associated with the second wire chamber and the second sensor cavity is configured to securely seat the second pair of load sensors, such that each load sensor of the second pair of load sensors is in electrical communication with the sensor wire; a second top platform having a second top surface, the second top platform being configured to be seated on and nested around each load sensor of the second pair of load sensors and the top portion of the second rail base body, such that a corresponding weight applied to the second top surface is exerted upon the second pair of load sensors; a strain meter having a display, wherein the strain meter is configured to be attached to the first top rail and in electrical communication with the sensor wire, such that a weight of a load exerted upon at least one of the top rails can be registered by a single load sensor; and a plurality of flexible straps, each flexible strap of the plurality of flexible straps having a first strap end and a second strap end attached to the first strap end, wherein each first strap end is configured to engage with the first top rail, and each second strap end is configured to engage with the second top rail. Thus, an advantage is that each leg of the load weighing luggage rack may be configured to pivot about a connection to an adjacent leg of a leg pair, such that the luggage rack may be selectively collapsed while not in use, allowing for easier transit and storage. Another advantage is that the way that each top rail is configured allows for as little as one load sensor to be positioned within each top rail while still allowing the load weighing luggage rack to measure the weight of piece of luggage accurately. The positioning of the load sensors within the top rails thusly does not impose an inherent maximum on the amount of load sensors that may be utilized by within each top rail, thus allowing the load weighing luggage rack to handle and accurately measure luggage having a greater weight, depending on the amount of load sensors implemented. Another advantage is that a support arm may be utilized to engage with corresponding legs to increase the structural integrity of the load weighing luggage rack, thus preventing bending or deformation while weighing heavier objects. Another advantage is that the usage of load sensors nested within the top rails allows the load weighing luggage rack to remain relatively small and non-bulky, thus allowing it to be transported more easily. Another advantage is that the plurality of straps may be directly attached to or suspended from the top platform of each top rail, such that the weight of a piece of luggage may be accurately measured regardless of the luggage's positioning on the straps and/or the top rails of the load weighing luggage rack.

In another aspect, a load weighing luggage rack is provided, the load weighing luggage rack comprising: a first leg; a second leg; a third leg; a fourth leg; a first top rail configured to engage with the first leg and the second leg, the first top rail comprising: at least one load sensor; a first rail base configured to engage with the at least one load sensor of the first top rail, such that the at least one load sensor of the first top rail is seated on the first rail base; a first top platform having a first top surface, the first top platform being configured to be seated on the at least one load sensor of the first top rail, such that a corresponding weight applied to the first top surface is exerted upon the at least one load sensor of the first top rail; a second top rail configured to engage with the third leg and the fourth leg, the second top rail comprising: at least one load sensor; a second rail base configured to engage with the at least one load sensor of the second top rail, such that the at least one load sensor of the second top rail is seated on the second rail base; a second top platform having a second top surface, the second top platform being configured to be seated on the at least one load sensor of the second top rail, such that a corresponding weight applied to the second top surface is exerted upon the at least one load sensor of the second top rail; a sensor wire nested within the first top rail and the second top rail, wherein the sensor wire is configured to be in electrical communication with the at least one load sensor of the first top rail and the at least one load sensor of the second top rail; a strain meter in electrical communication with the sensor wire, such that a weight of a load exerted upon at least one of the top rails can be registered by a single load sensor; and a plurality of flexible straps, each flexible strap of the plurality of flexible straps having a first strap end and a second strap end attached to the first strap end, wherein each first strap end is configured to engage with the first top rail, and each second strap end is configured to engage with the second top rail. Again, an advantage is that each leg of the load weighing luggage rack may be configured to pivot about a connection to an adjacent leg, such that the luggage rack may be selectively collapsed while not in use, allowing for easier transit and storage. Another advantage is that the way that each top rail is configured allows for as little as one load sensor to be positioned within each top rail while still allowing the load weighing luggage rack to measure the weight of piece of luggage accurately. The positioning of the load sensors within the top rails thusly does not impose an inherent maximum on the amount of load sensors that may be utilized by within each top rail, thus allowing the load weighing luggage rack to handle and accurately measure luggage having a greater weight, depending on the amount of load sensors implemented. Another advantage is that a support arm may be utilized to engage with corresponding legs to increase the structural integrity of the load weighing luggage rack, thus preventing bending or deformation while weighing heavier objects. Another advantage is that the usage of load sensors nested within the top rails allows the load weighing luggage rack to remain relatively small and non-bulky, thus allowing it to be transported more easily. Another advantage is that the plurality of straps may be directly attached to or suspended from the top platform of each top rail, such that the weight of a piece of luggage may be accurately measured regardless of the luggage's positioning on the straps and/or the top rails of the load weighing luggage rack.

In another aspect, a load weighing luggage rack is provided, the load weighing luggage rack comprising: a first rail support; a second rail support; a first top rail disposed above and engaged with the first support, the first top rail comprising: at least one load sensor; a first top platform configured to be seated on the at least one load sensor of the first top rail, such that a corresponding weight applied to the first top platform is exerted upon the at least one load sensor of the first top rail; a second top rail disposed above and engaged with the second support, the second top rail comprising: at least one load sensor; a second top platform configured to be seated on the at least one load sensor of the second top rail, such that a corresponding weight applied to the second top platform is exerted upon the at least one load sensor of the second top rail; a flexible strap configured to engage with the first top rail and the second top rail; and a strain meter in electrical communication with the at least one load sensor of the first top rail and the at least one load sensor of the second top rail, such that a weight of a load exerted upon at least one of the top rails can be registered by a single load sensor. Again, an advantage is that each rail support of the load weighing luggage rack may be configured to pivot about a connection to an adjacent rail support, such that the luggage rack may be selectively collapsed while not in use, allowing for easier transit and storage. Another advantage is that the way that each top rail is configured allows for as little as one load sensor to be positioned within each top rail while still allowing the load weighing luggage rack to measure the weight of piece of luggage accurately. The positioning of the load sensors within the top rails thusly does not impose an inherent maximum on the amount of load sensors that may be utilized by within each top rail, thus allowing the load weighing luggage rack to handle and accurately measure luggage having a greater weight, depending on the amount of load sensors implemented. Another advantage is that a support arm may be utilized to engage with corresponding rail supports to increase the structural integrity of the load weighing luggage rack, thus preventing bending or deformation while weighing heavier objects. Another advantage is that the usage of load sensors nested within the top rails allows the load weighing luggage rack to remain relatively small and non-bulky, thus allowing it to be transported more easily. Another advantage is that the strap may be directly attached to the top platform of each top rail, such that the weight of a piece of luggage may be accurately measured regardless of the luggage's positioning on the straps and/or the top rails of the load weighing luggage rack.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1A:
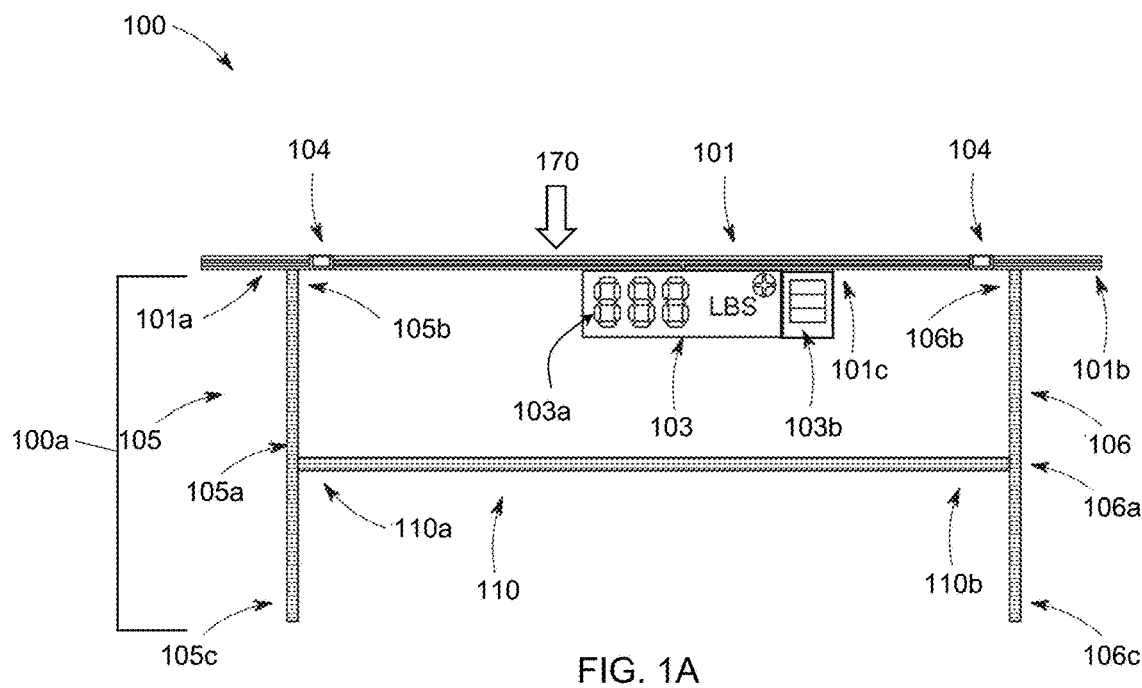
FIGS. 1A-1B illustrates the front and rear cross-sectional views, respectively, of a load weighing luggage rack 100, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

For the following description, it can be assumed that most correspondingly labeled elements across the figures (e.g. 305, 405, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1B:
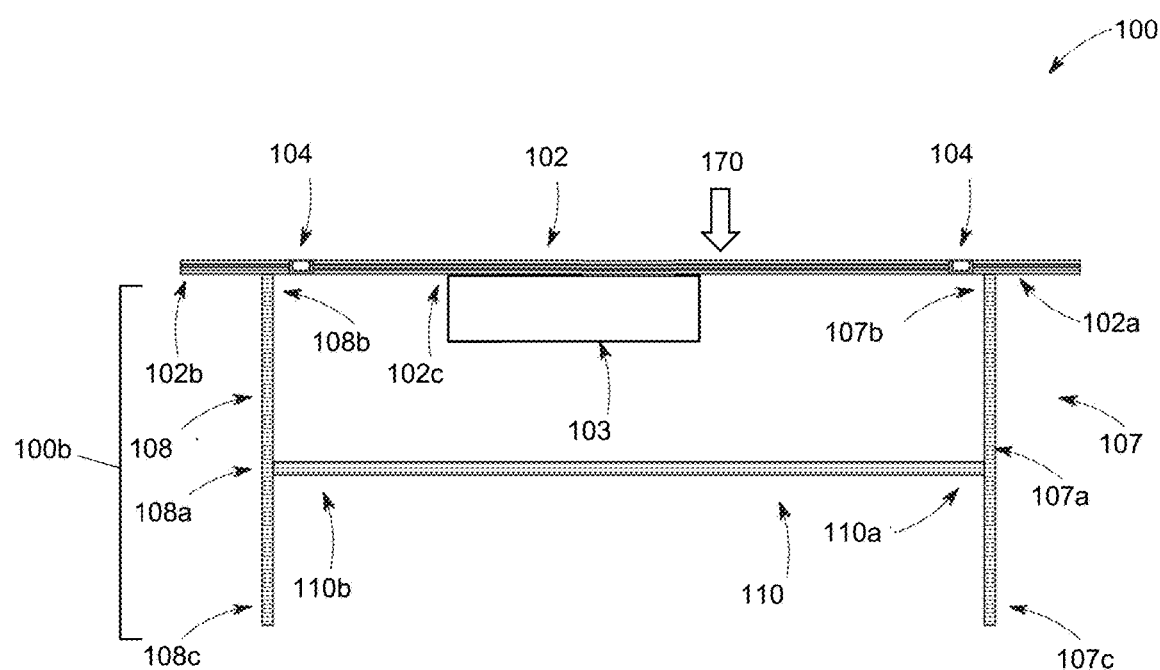

FIGS. 1A-1B illustrates the front and rear cross-sectional views, respectively, of a load weighing luggage rack 100, according to an aspect. The load weighing luggage rack ("luggage rack") 100 may be configured to be utilized by an individual to support one or more pieces of luggage, packages or other items above the ground, while being able to determine the weight of said piece(s) of luggage, package(s) or item(s) in real time. The load weighing luggage rack 100 may utilize a plurality of load sensor 104 nested within a pair of top rails 101, 102 in order to provide an easily transportable and light weight luggage rack 100 that may be selectively folded or collapsed into a smaller form for storage and/or transit in certain embodiments.

The load weighing luggage rack 100 may be comprised of a pair of top rails: a first top rail 101 and a second top rail 102. The first top rail 101 may have a first end 101a, a second end 101b and a middle portion 101c disposed between and associated with the first end 101a and second end 101b of the first top rail 101. Similarly, the second top rail 102 may also have a corresponding first end 102a, a corresponding second end 102b, and a corresponding middle portion 102c disposed between and associated with the first end 102a and the second end 102b of the second top rail 102. In an embodiment the first and second top rails 101, 102 may have the same structure, with the exception of a strain meter 103, which may be associated with the first top rail 101 in some embodiments, which will be discussed in greater detail hereinbelow. In an embodiment, the first top rail 101 may be engaged with the second top rail 102 by a plurality of flexible straps, such as flexible straps ("straps") 560 of FIG. 5, which will also be described in greater detail hereinbelow. In an embodiment, the first top rail 101 may remain parallel with the second top rail 102 regardless of the configuration of the load weighing luggage rack 100. In said embodiment, each flexible strap of the plurality of flexible straps may have a fixed length, while being configured to be selectively folded. It should be understood that a singular flexible strap may be used to engage the first top rail 101 with the second top rail 102 in some embodiments.

The load weighing luggage rack 100 may be further comprised of a plurality of legs 105-108 configured to engage/couple with and elevate the top rails 101, 102. A first leg 105 may have a first leg top 105b, a first leg bottom 105c, and first leg middle 105a disposed between and associated with the first leg top 105b and the first leg bottom 105c. A second leg 106 may have a second leg top 106b, a second leg bottom 106*c*, and second leg middle 106*a* disposed between and associated with the second leg top 106*b* and the second leg bottom 106*c*. In an embodiment, the first leg top 105*b* may be engaged/coupled with the first end 101*a* of the first top rail 101, whereas the second leg top 106*b* may be engaged/coupled with the second end 101*b* of the first top rail 101. A third leg 107 may have a third leg top 107*b*, a third leg bottom 107*c*, and third leg middle 107*a* disposed between and associated with the third leg top 107*b* and the third leg bottom 107*c*. A fourth leg 108 may have a fourth leg top 108*b*, a fourth leg bottom 108*c*, and fourth leg middle 108*a* disposed between and associated with the fourth leg top 108*b* and the fourth leg bottom 108*c*.

In an embodiment, the third leg top 107*b* may be engaged/coupled with the first end 102*a* of the second top rail 102, whereas the fourth leg top 108*b* may be engaged/coupled with the second end 102*b* of the second top rail 102. In an alternative embodiment, the engagements between each leg 105, 106, 107, 108 and the corresponding top rail 101, 102 may be pivotal engagements, such that each leg is configured to pivot about the corresponding top rail 101, 102 that it engages with. It should also be understood that alternative embodiments of the load weighing luggage rack may utilize different quantities of legs to support the top rails 101, 102, and that the number of legs utilized may be varied independently of the number of load sensors 104 used, as a result of the load sensors 104 being nested within their corresponding top rails 101, 102. Furthermore, the disposition of at least one load sensor 104 within each top rail 101, 102 provides independent weighing capabilities to each top rail 101, 102 such that a weight of a load exerted upon at least one of the top rails can be registered by a single load sensor.

The load weighing luggage rack 100 may also be further comprised of a support arm 110 having a first support end 110*a* attached to a second support end 110*b*. The support arm 110 may be configured to engage with the legs of the load weighing luggage in order to provide structural support to the load weighing luggage rack 100. In an embodiment, the first support end 110*a* of the support arm 110 may be securely coupled between the first leg middle 105*a* and the first leg bottom 105*c* of the first leg 105, while the second support end 110*b* of the support arm 110 may be securely coupled between the second leg middle 106*a* and the second leg bottom 106*c* of the second leg 106. Depending on the configuration of the legs 105, 106, 107, 108, the engagements between the support arm(s) 110 and the legs may vary.

Different embodiments of the load weighing luggage rack 100 may be implemented in which the particular configuration of the legs 105, 106, 107, 108 may vary. In an embodiment, the first leg 105 may intersect the third leg 107, thus forming a "X-shaped structure" as seen in FIG. 4A, while the second leg 106 may intersect the fourth leg 108, thus forming a "X-shaped structure", as seen in FIG. 4B. In said embodiment, the support arm 110 may be disposed between and associated with the middle portions 105*a*, 107*a* of the first and third leg 105, 107 and the middle portions 106*a*, 108*a* of the second and fourth legs 106, 108, as seen in FIGS. 4A-4B. In an alternative embodiment, a first support arm, such as first support arm 310-1 of FIG. 3A, may be disposed between and associated with the first leg 105 and the third leg 107, whereas a second support arm, such as second support arm 310-2 of FIG. 3B, may be disposed between and associated with the second leg 106 and the fourth leg 108. These embodiments will be discussed in greater detail hereinbelow.

In an embodiment, a strain meter 103 may be associated with the first top rail 101 and oriented such that a user standing in front of the load weighing luggage rack 100 may utilize the strain meter 103 and view its associated display screen 103*a*. The strain meter 103 may be in electrical communication with each load sensor 104 nested within the first and second top rails 101, 102, such that the strain meter 103 is configured to measure and display the weight of a load resting on top of the first and/or second top rails 101, 102, and/or on top of corresponding straps, such as strap 860 of FIG. 8A, depending on the embodiment. The strain meter may have a display screen 103*a* configured to provide the user with a visual indication of the weight of the held load, and an actuator 103*b* electrically associated with the display screen, wherein said actuator 103*b* is configured to selectively power on the strain meter 103. In an embodiment, the display screen 103*a* of the strain meter 103 may be a light-emitting diode (LED) lit display, but other types of displays are hereby contemplated, such as, but not limited to, cathode ray tube (CRT), liquid crystal display (LCD), etc. In an embodiment, the actuator 103*b* may be a button, but other types of actuators are hereby contemplated, including, but not limited to, a toggle switch, a touch screen, a wireless connectivity to an application on a computing device, smartphone etc.

It should be understood that the size/dimensions of the load weighing luggage rack 100 and its components may be varied in accordance with the desired application and use-case for said load weighing luggage rack 100. In an embodiment, the load weighing luggage rack 100 may have a height of 25 inches, a length of 36 inches, and a width of 20 inches. In alternative embodiments, the luggage rack may have a greater or lesser height, length and width, depending on the intended user, type of luggage being weighed, etc. In an embodiment, the load weighing luggage rack 100 may have a general shape consistent with that of a rectangular prism, but other shapes are hereby contemplated, including, but not limited to, a square prism, oblong shapes, other round shapes, etc. In an embodiment, the load weighing luggage rack 100 may be made of a wood material, but other materials are hereby contemplated, including, but not limited to, metal such as steel, aluminum, etc., poly-vinyl chloride (PVC), high-density polyethylene (HDPE), hard-plastic, and/or any combination of suitably strong, light-weight materials, etc.

In an embodiment, the load sensors 104 nested within each top rail 101, 102 may be suitably positioned in order to facilitate accurate weight determinations of a load positioned across the top rails 101, 102. In a preferred embodiment, the plurality of load sensors 104 disposed within each top rail 101, 102 may be substantially equally spaced (e.g., each sensor within a top rail is separated from adjacent load sensors within said top rail by an equal distance), but alternative load sensor positioning, and quantities may also be utilized as necessary or desirable. As is understood, a load positioned on top of at least one of the top rails 101, 102 would exert a downward force ("weight) 170 upon said top rail 101, 102, wherein the downward force 170 would be applied upon the corresponding load sensors 104. It should be understood that the summation of the weights exerted on each load sensor by a load positioned on top of the corresponding top rails(s) would correspond to the weight of said load. Furthermore, the weight of any elements of the load weighing luggage rack 100 that may be positioned on top of the load sensors 104, such as top platform 630 of FIG. 6A, would be accounted for, and thus omitted from a resultant weight measurement, thus ensuring only the weight of the load is provided to a user.

It should be understood that the interconnection between each element of the load weighing luggage rack 100 may be facilitated though the utilization of standard fasteners and/or standard engagement methods used in the industry. In an embodiment, each leg 105-108 of the load weighing luggage rack 100 may be configured to engage with a corresponding top rail 101, 102 through usage of screws, adhesives, clasps, etc. In an alternative embodiment, each leg 105-108 of the load weighing luggage rack 100 may be configured to engage with a corresponding top rail 101,102 through the usage of a pivot joint, or other fastener that enable pivotal engagement between corresponding elements, as applicable. Furthermore any electrical interconnections utilized to facilitate electrical communication between corresponding electrical elements, such as the load sensors 104 and the strain meter 103, may be facilitated through conventional electrical interconnection elements, such as electrical wires or other conductive pathways.

In a simplified embodiment, the load weighing luggage rack 100 may be comprised of a first top rail 101, a second top rail 102, a first rail support 100a configured to engage with and elevate the first top rail 101, a second rail support 100b configured to engage with and elevate the second top rail 102 and a flexible strap configured to engage the first top rail 101 and the second top rail 102. In certain embodiments, the first rail support 100a may be attached to or otherwise engaged with the second rail support 100b, wherein said engagement may be configured increase the structural integrity of the load weighing luggage rack 100, enable selective folding/collapse of the load weighing luggage rack, etc., as disclosed herein. In an embodiment, each rail support 100a, 100b may be comprised of one or more legs, wherein support arms 110 may be utilized within the structure of a rail support and/or to connect the first rail support to the second rail support, as applicable. The height of each rail support 100a, 100b may also be equal in an embodiment, such that each top rail 101, 102 is at the same height/elevation. By elevating each top rail 101, 102, users may find it easier to place a piece of luggage on said top rails 101, 102 without bending over too far.

Figure 2:
FIG. 2 illustrates the top plan view of a rear guard configured to engage with the load weighing luggage rack, according to an aspect.

FIG. 2 illustrates the top plan view of a rear guard 224 configured to engage with the load weighing luggage rack, according to an aspect. In certain applications, it may be useful or necessary to provide additional structures on the load weighing luggage rack in order to ensure that an item remains securely supported on the top rails of the load weighing luggage rack during use. As such, a rear guard 224 may be configured to engage with a corresponding top rail of load weighing luggage rack, such as the second top rail 102 of FIG. 1B, in order to provide additional safety and support to a held item during use, thus being configured to secure a load on top of the load weighing luggage rack. The rear guard 224 may be comprised of a guard rail 225 having a first guard rail end 225a and a second guard rail end 225b. The rear guard 224 may be further comprised of a first engagement member 226 associated with the first guard rail end 225a and a second engagement member 227 associated with the second guard rail end 225b.

In an embodiment, the first engagement member 226 may be configured to be securely coupled to (or substantially near to) the first end 102a of the second top rail 102, whereas the second engagement member 227 may be configured to be securely coupled to (or substantially near to) the second end 102b of the second top rail 102. The rear guard 224 may be configured to selectively attached to one of the top rails through the usage of conventional fasteners, such as clips, claps, screws etc., as long as a secure but reversible engagement between the rear guard 224 and a top rail may be selectively established.

Figure 3A:
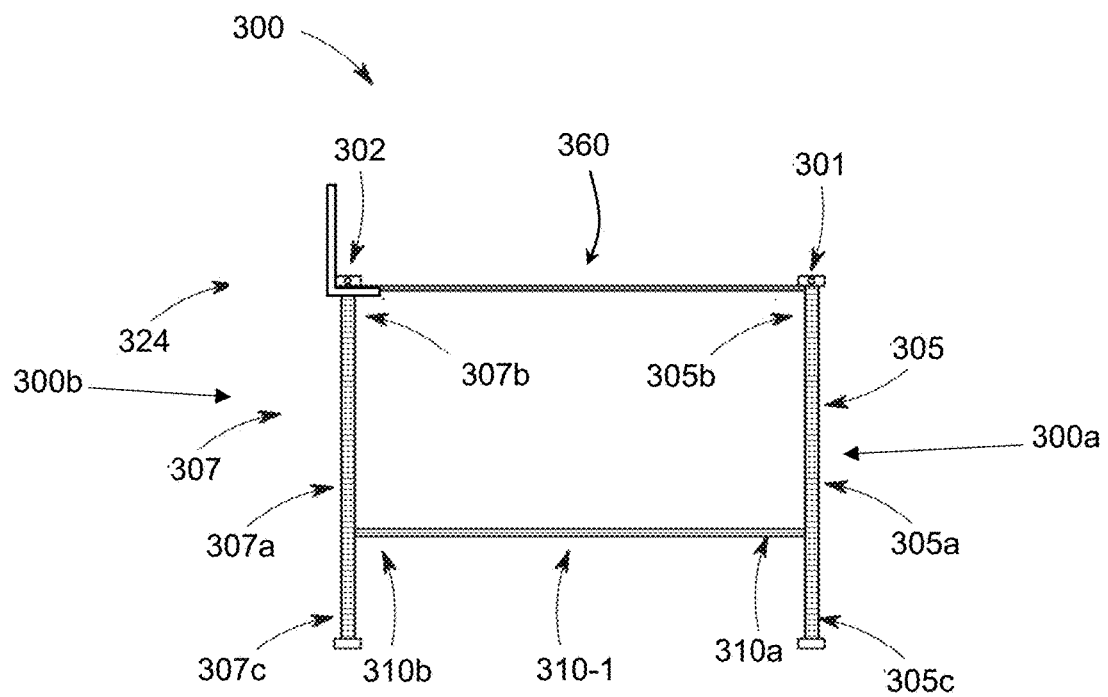
FIGS. 3A-3B illustrate the left and right side elevation views, respectively, of a rear guard engaged with the second top rail of load weighing luggage rack, the load weighing luggage rack having parallel legs, according to an aspect.
Figure 3B:
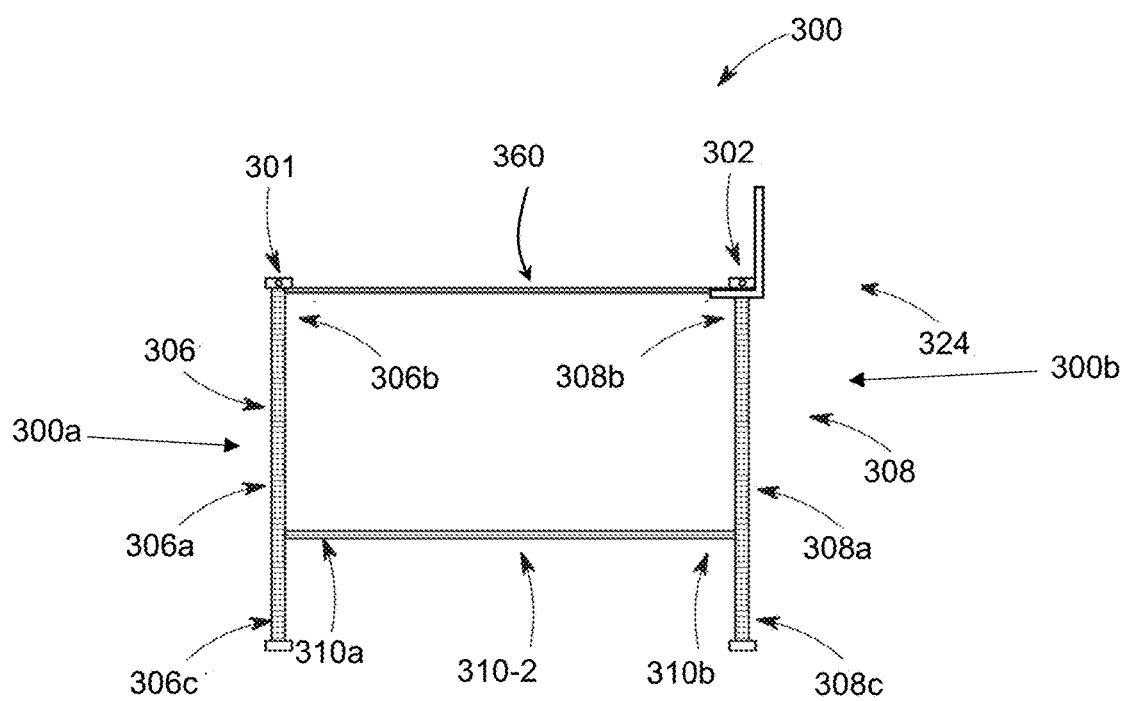
Figure 4A:
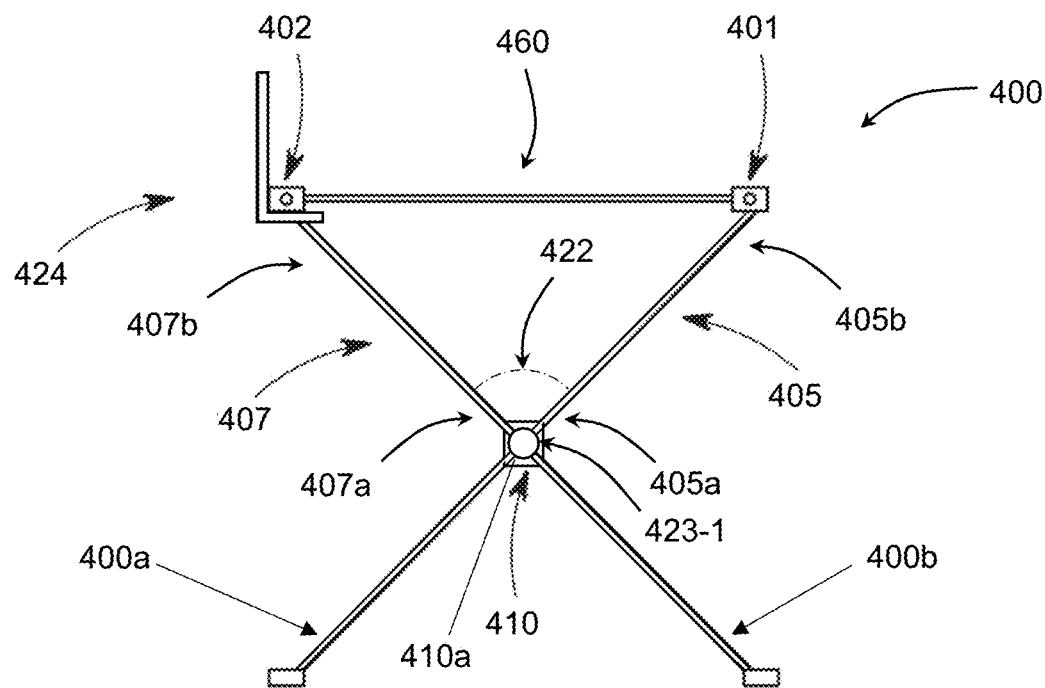
FIGS. 4A-4B illustrate the left and right side elevation views, respectively, of a rear guard engaged with the second top rail of a load weighing luggage rack, the load weighing luggage rack having crossed legs, according to an aspect.
Figure 4B:
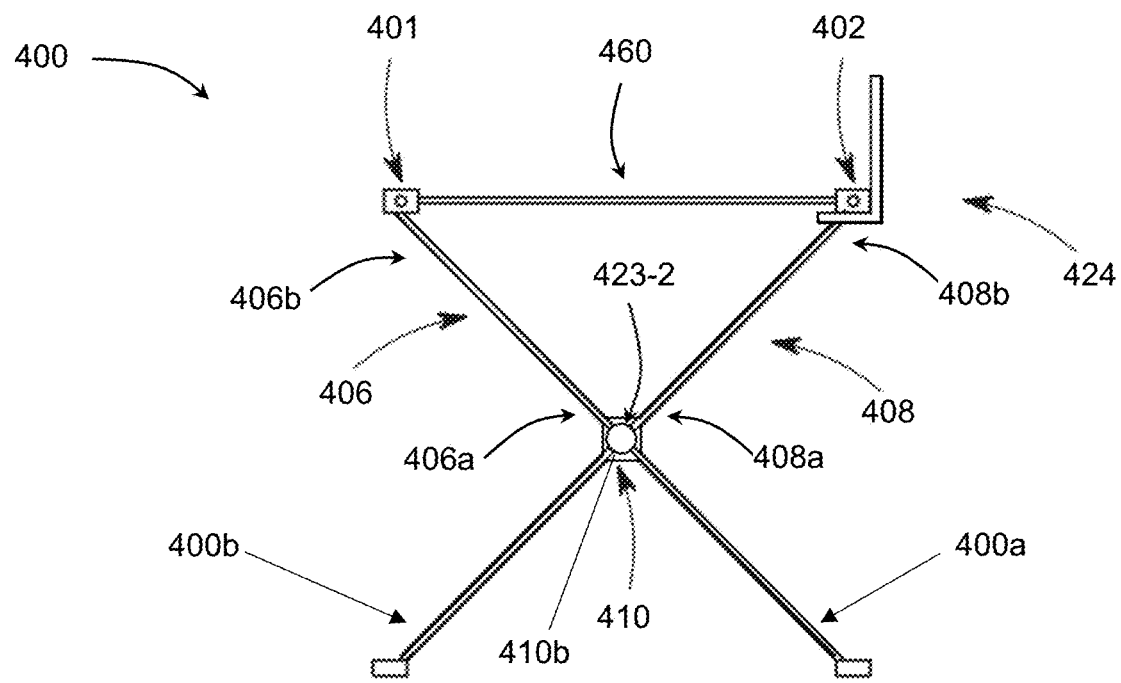

FIGS. 3A-3B illustrate the left and right side elevation views, respectively, of a rear guard 324 engaged with a second top rail 302 of a load weighing luggage rack 300, the load weighing luggage rack 300 having parallel legs, according to an aspect. As disclosed hereinabove, multiple leg configurations may be possible for the herein disclosed load weighing luggage rack 300. In an embodiment, each leg 305, 306, 307, 308 may all be parallel with each other and perpendicular to their corresponding engaged top rails 301, 302. In an embodiment, the first leg top 305b and second leg top 306b may be coupled to the first top rail 301, whereas the third leg top 307b and the fourth leg top 308b may be coupled to the second top rail 302. Furthermore, the first and third legs 305, 307 may attach substantially near to first ends of first top rail 301 and the second top rail 302, respectively, while the second and fourth legs 306, 308 may attach substantially near to the second ends of the first top rail 301 and the second top rail 302, respectively.

In an embodiment, such as the embodiment shown in FIG. 3A-3B, two support arms 310-1, 310-2, may be utilized. For a first support arm 310-1, a first support end 310a of a first support arm 310-1 may be secured to the first leg 305 between the first leg middle 305a and the first leg bottom 305c while a second support end 310b of the first support arm 310-1 may be secured to the third leg 307 between the third leg middle 307a and the third leg bottom 307c, thus securing the first and third legs 305, 307 together. Similarly, for the second support arm 310-2, a first support end 310a of a second support arm 310-2 may be secured to the second leg 306 between the second leg middle 306a and the second leg bottom 306c while a second support end 310b of the second support arm 310-2 may be secured to the fourth leg 308 between the fourth leg middle 308a and the fourth leg bottom 308c, thus securing the second and fourth legs 306, 308 together. The first top rail 301 may also be secured to the second top rail 302 by a plurality of straps 360, as will be discussed hereinbelow.

As can be seen in FIG. 3A-3B the first rail support 300a may be comprised of first leg 305 and a second leg 306, whereas the second rail support 300b may be comprised of a third leg 307 and a fourth leg 308. The first rail support 300a may be secured to the second rail support 300b by a pair of support arms 310-1, 310-2, as discussed hereinabove for the interconnections between the legs of FIG. 3A-3B. The legs of first rail support 300a and second rail support 300b may establish a pivotal connection with their corresponding top rail 301, 401, depending on if folding capabilities of said load weighing luggage rack 300 is desired for said embodiment. In an embodiment, each leg 305-308 may be pivotally engaged with a corresponding top rail 301, 302, such that each leg 305-308 may be folded beneath the top rails 301, 302 to facilitate easy storage and transit of the load weighing luggage rack 300.

FIGS. 4A-4B illustrate the left and right side elevation views, respectively, of a rear guard 424 engaged with the second top rail 402 of a load weighing luggage rack 400, the load weighing luggage rack 400 having crossed legs, according to an aspect. In contrast to the load weighing luggage rack 300 embodiment of FIGS. 3A-3B, the load weighing luggage rack 400 of FIGS. 4A-4B may utilize crossed legs that are pivotally attached to each other accordingly in order to facilitate the selective collapsing of the load weighing luggage rack 400 while not in use. The pivotal attachment of each leg 405, 406 to a corresponding partner leg 407, 408 will be described in greater detail hereinbelow.

Similarly to previous embodiments, the first leg top 405b may be attached to the first top rail 401 substantially near to the first end of the first top rail 401, the second leg top 406b may be attached to the first top rail 401 substantially near to the second end of the first top rail 401, the third leg top 407b may be attached to the second top rail 402 substantially near to the first end of the second top rail 402, and the fourth leg top 408b may be attached to the second top rail 402 substantially near to the second end of the second top rail 402, Furthermore, the first leg middle 405a may be pivotally engaged with the third leg middle 407a by a leg first leg pivot 423-1, as seen in FIG. 4A, whereas the second leg middle 406a may be pivotally engaged with the fourth leg middle 408a by a second leg pivot 423-2. Each leg pivot 423-1, 423-2 may be configured to securely and pivotally engage each corresponding leg together, while still allowing for selective rotation of each leg about said leg pivot. The first leg 405 and third leg 407 may be referred to as a first leg pair, while the second leg 406 and fourth leg 408 may be referred to as a second leg pair. Each leg pair may form an approximate "X-shaped structure" as can be seen in FIGS. 4A-4B, which coincides with the "operational position" in which the load weighing luggage rack 400 is ready to support/weigh an object.

While in the operational position, a plurality of straps 460 configured to engage with the first top rail 401 and the second top rail 402 may be fully extended and unfolded, whereas said straps may be configured to bend/fold as the first top rail 401 is brought closer to the second top rail 402, such as in a stowed position, wherein the load weighing luggage rack may be picked up and carried more easily. In an embodiment, each strap 460 may have a fixed maximum length, such that each leg may be selectively pivoted between a certain range of angles, wherein the first top rail 401 and the second top rail 402 may have a maximum separation consistent with the straps 460 being fully extended about their entire length (the operational position) and a minimum separation distance consistent with the straps 460 being folded to allow the first top rail 401 to contact, or be moved into close proximity to, the second top rail 402. As such, the height and width of the luggage rack may vary in accordance with the pivot angle 422 between legs in a pair of leg, length of the straps, current position, etc.)

Similarly to the embodiment of FIG. 1, a singular support arm 410 may be utilized for the crossed leg embodiment of the load weighing luggage rack 400 of FIGS. 4A-4B. In an embodiment, the first support end 410a of the support arm 410 may be configured to engage with the first leg middle 405a and the third leg middle 407a, such that the support arm 410 may allow the first leg 405 and the third leg 407 to remain pivotally engaged with each other, accordingly. In the same embodiment, the second support end 410b of the support arm 410 may be configured to engage with the second leg middle 406a and the fourth leg middle 408a, such that the support arm 410 may allow the second leg 406 and the fourth leg 408 to remain pivotally engaged with each other, accordingly. The support arm 410 disposed between the first leg pair and the second leg pair may be configured to improve the structural integrity of the load weighing luggage rack 400 by preventing each leg pair from bowing toward or away from the opposing leg pair, regardless the of the presence of a weight from a load on the load weighing luggage rack 400, while still allowing the legs of each leg pair to remain pivotally engaged with each other.

As can be seen in FIG. 4A-4B the first rail support 400a may be comprised of the first leg 405 and the second leg 406, wherein the second rail support 400b may be comprised of the third leg 407 and the fourth leg 408. By virtue of the pivotally engaged leg pairs described above, in the embodiment of FIG. 4A-4B the first rail support 400a may itself be pivotally engaged with the second rail support 400b to enable the selective folding/selective collapsing capabilities described herein. As disclosed hereinabove, a support arm 410 may be disposed between each leg pair, and thus may not be considered to be a component of either rail support 400a, 400b in said embodiment. For example, the first leg middle 105a may be pivotally engaged with the third leg middle 107a and the second leg middle 106a may be pivotally engaged with the fourth leg middle 108a, while each flexible strap 460 of the plurality of flexible straps may be configured to be folded. As such, the resultant load weighing luggage rack 400 may be configured to be selectively collapsed by pivoting the first leg 405 about the third leg 407 while simultaneously pivoting the second leg 406 about the fourth leg 408, thus folding each flexible strap 460 of the plurality of flexible straps and rotating or otherwise moving the first top rail 401 toward the second top rail 402.

Figure 5:
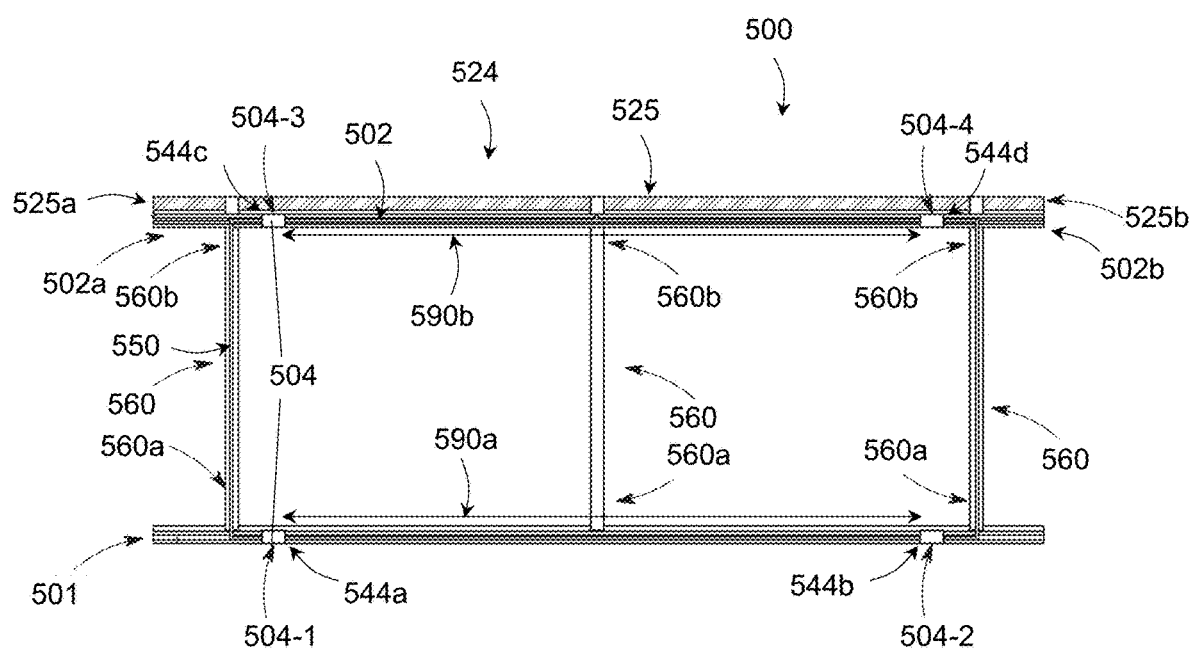
FIG. 5 illustrates the top cross-sectional view of a load weighing luggage rack having a rear guard, according to an aspect.

FIG. 5 illustrates the top cross-sectional view of a load weighing luggage rack 500 having a rear guard 524, according to an aspect. As can be seen in the load weighing luggage rack 500 of FIG. 5, the first top rail 501 may be parallel with the second top rail 502, as well as the guard rail 525 of the rear guard 524. In an embodiment, the first guard rail end 525a, and thus the first engagement member, such as first engagement member 226 of FIG. 2, may be disposed substantially near to the first end 502a of the second top rail 502, while the second guard rail end 525b, and thus the second engagement member, such as second engagement member 227 of FIG. 2, may be disposed substantially near to the second end 502b of the second top rail 502. The coupling of the rear guard 524 to the second top rail 502 may be done reversibly, such that rear guard 524 may only be utilized when it is necessary or desirable to do so.

A plurality of load sensors 504 may be nested within, or otherwise securely coupled to, each top rail 501, 502, such that an object placed across the first top rail 501 and the second top rail 502 simultaneously may have the full force of its weight exerted upon the plurality of load sensors 504. In an embodiment, a first pair of load sensors comprising a first load sensor 504-1 and a second load sensor, 504-2 may be nested within the first top rail 501, whereas a second pair of load sensors comprising a third load sensor 504-3 and a fourth load sensor 504-4 may be nested within the second top rail 502.

In an embodiment, each load sensor may be nested within a corresponding sensor pocket 544a-544d of a corresponding top rail 501, 502. For example, the first load sensor 504-1 may be nested within a first sensor pocket 544a within the first top rail 501 and the second load sensor 504-2 may be nested within a second sensor pocket 544b within the first top rail 501. The first sensor pocket 544a and second sensor pocket 544b may together be referred to as a first sensor cavity, such as first sensor cavity 844-1 of FIG. 8A. Furthermore, the third load sensor 504-3 may be nested within a third sensor pocket 544c within the second top rail 502 and the fourth load sensor 504-4 may be nested within a fourth sensor pocket 544d within the second top rail 502. The third sensor pocket 544c and the fourth sensor pocket 544d may together be referred to as a second sensor cavity, such as second sensor cavity 844-2 of FIG. 8A.

In an embodiment, the distance between the first and second load sensors 504-1, 504-2 may be equivalent to the distance between the third and fourth load sensors 504-3, 504-4, though the separations between each sensor may be modified as needed by the user. In other words, a first separation distance 590a between the first pair of loads sensors (the distance between the first load sensor 504-1 and the second load sensor 504-2) may be equivalent to a second separation distance 590b between the second pair of load sensors (the distance between the third load sensor 504-3 and the fourth load sensor 504-4).

As disclosed hereinabove, the first top rail 501 may be associated with the second top rail 502 by a plurality of straps 560. Each strap 560 of the plurality of straps may be comprised of a first strap end 560a attached to a second strap end 560b, wherein each first strap end 560a is configured to attach to the first top rail 501 and each second strap end 560b is configured to attach to the second top rail. In an embodiment, each strap 560 may be parallel with every other strap 560, as seen in FIG. 5. Each strap 560 of the plurality of straps may be made of a flexible, bendable material, such that upon pivoting the legs of each leg pair, if applicable, the first top rail 501 is moved closer to the second top rail 502, such that each strap may be flexibly folded. The length of each strap 560 may determine the maximum separation distance between the first top rail 501 and the second top rail 502, due to the direct connection between each strap 560 and both top rails 501, 502. While the material(s) utilized for the straps may be flexible and bendable to allow for the selective collapsing of the load weighing luggage rack 500, said material may be sufficiently durable and have a fixed length, to prevent the first top rail 501 and the second top rail 502 from becoming separated by a distance greater than that of the operational position articulated in FIGS. 4A-4B, wherein each leg pair forms an X-shape. As such, this fixed length of each strap 560 will dictate the overall dimensions (such as height and width) of the load weighing luggage rack while the operational position, as well as the angle at which each pair of corresponding legs intersects. In an embodiment, a sensor wire 550 configured to interconnect the load sensors 504 and the strain meter may be woven into corresponding straps 560 of the plurality of straps, in order to allow the sensor wire to travel between the first top rail 501 and the second top rail 502 as needed.

Figure 6A:
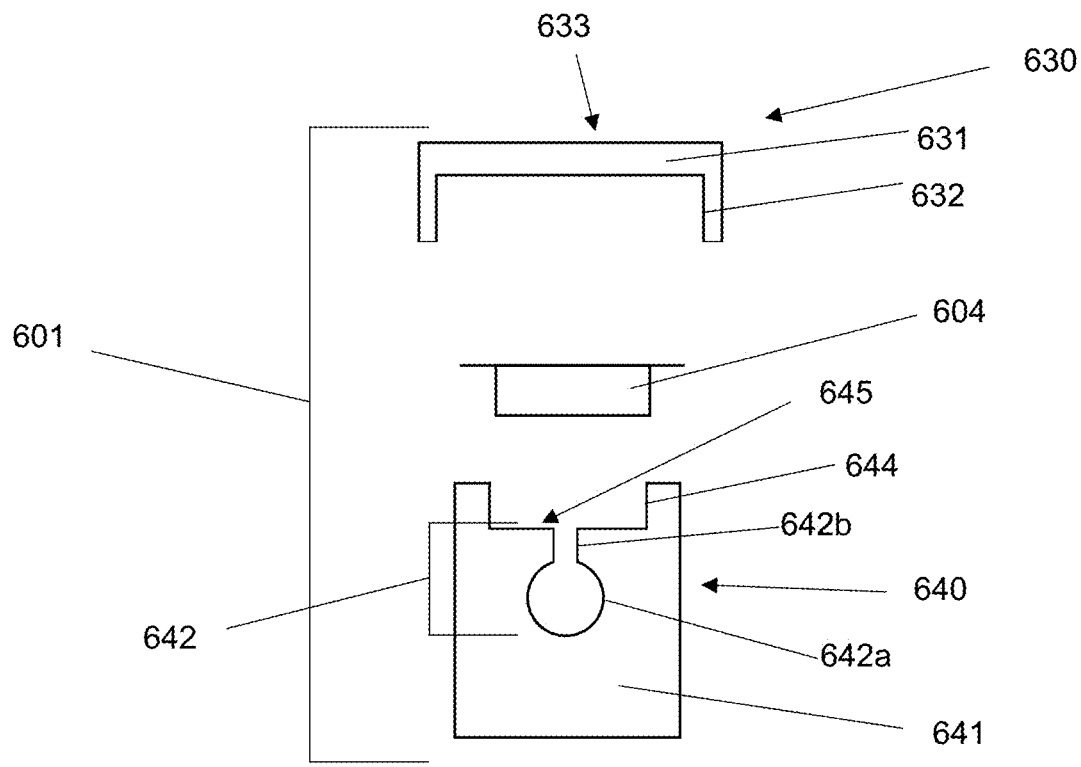
FIGS. 6A-6B illustrates the exploded, cross-section side view and the cross-sectional side view, respectively, of a top rail having an internally nested load sensor, according to an aspect.
Figure 6B:
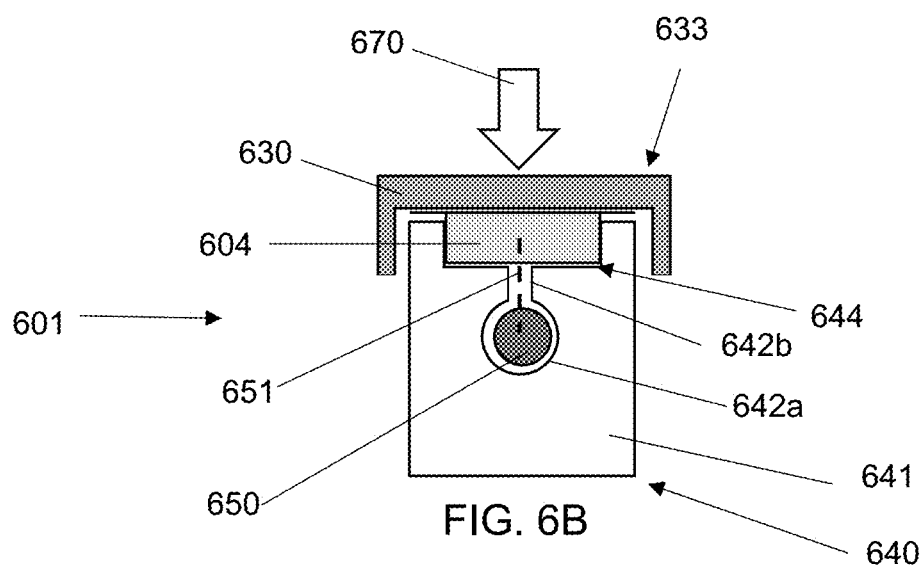

FIGS. 6A-6B illustrates the exploded, cross-section side view and the cross-sectional side view, respectively, of a top rail 601 having an internally nested load sensor 604, according to an aspect. As disclosed previously, the 601 top rails, such as the first top rail 101 and the second top rail 102 of FIG. 1, may be configured to house a plurality of load sensors 604 in order to suitably facilitate the weighing of a piece of luggage, or other object, disposed on top of said rails 101, 102 and/or straps, depending on the configuration. Each top rail 601 may be comprised of a rail base 640, at least one load sensor 604 configured to be securely seated on the rail base 640, and a top platform 630 configured to be seated on top of the at least one load sensor 604, such that the at least one load sensor 604 is securely nested between the top platform 630 and the rail base 640

As can be seen in FIG. 6A-6B, the rail base 640 may be comprised of a rail base body 641 having a top portion 645, a horizontal wire channel 642a nested within the rail base body 641, a vertical wire channel 642b nested within the rail base body 641, such that the vertical wire channel 642b is disposed above and associated with the horizontal wire channel 642a, and a sensor cavity ("load sensor cavity") 644 nested within the rail base body 641, such that it is disposed above and associated with the vertical wire channel 642b. The horizontal wire channel may have a circular shape, when viewed from a cross-sectional view, as seen in FIG. 6A, such that the shape and size of horizontal wire channel 642a allows said horizontal wire channel 642a to securely house a corresponding sensor wire 650. It should be understood that the horizontal wire channel 642a and the vertical wire channel 642b together may be identified as a wire chamber 642, for simplification purposes, wherein the wire chamber 642 is configured to contain the corresponding portions of the sensor wire 650, including any direct connections to each load sensor 604, while being associated with each corresponding sensor cavity 644 of a top rail 601 accordingly. As such, the first top rail 601 may have a first wire chamber 642 nested within the first rail base body 641, and the second top rail may have a second wire chamber 642 nested within the second rail base body, accordingly.

The sensor cavity 644 nested within the top portion 645 of the rail base body 641 may be configured such that a load sensor 604 nested within said sensor cavity 644 is disposed on/nested within the top portion 645 of the rail base body 641, such that the seated load sensors 604 are thusly configured to engage with the above top platform 630 of the top rail 601. It should be understood that the shape and size of the load sensor cavity 644 may be adjusted accordingly to fit the desired size and type of load sensor(s) 604. In an embodiment, each rail base 640 may be configured to seat at least two load sensors 604, wherein the at least two load sensors 604 are separated by a suitable length to accurately measure a weight disposed on top of the above top platform 630.

In an embodiment, each rail base body 641 may have a corresponding, individual sensor pocket for each load sensor 604 within a sensor cavity 644, with the quantity of load sensor pockets within a load sensor cavity 644 being consistent with the quantity of load sensors 604 nested within a corresponding top rail 601. For example, for a first top rail 601 having first load sensor and a second load sensor, the first load sensor may be nested within a corresponding first sensor pocket of the first sensor cavity, such as first sensor pocket 544a of FIG. 5, whereas the second load sensor may be nested within a corresponding second sensor pocket of the first sensor cavity, such as second sensor pocket 544b of FIG. 5. In an alternative embodiment, a singular, unified sensor cavity 644 may extend through the length of the corresponding rail base body 641, such that each rail base body 644 has a singular continuous sensor pocket configured to house all load sensors 604 of the corresponding top rail 601.

In an embodiment, each load sensor 604 may be seated on/nested within a corresponding rail base body 641, such that each load sensor 604 is configured to be compressed by a load placed on top of the top platform 630. Each load sensor 604 may be in electrical communication 651 with the sensor wire 650, such that each sensor load sensor 604 is in electrical communication with the strain meter, such as strain meter 103 of FIG. 1. By establishing electrical communication between each load sensor 604 and said strain meter, a weight of a load being exerted on at least one of the load sensors may be measured and displayed to a user by the strain meter.

As disclosed hereinabove, the top platform 630 may be configured to rest on top of the load sensor 604. As such, an object positioned on a top surface 633 of the top platform 630 may be configured to exert a corresponding weight 670 on the load sensor(s) 604 disposed beneath it. Each top platform 630 may be comprised of a top platform body 631 having a concave shape, wherein a top platform pocket 632 disposed within the top platform body 631 may be configured to surround and engage with the at least one load sensor 604 and the top portion 645 of the rail base 640. The secure engagement between the rail base 640, the at least one load sensor 604 and the top platform 630 allows each top rail 601 to thusly be configured to measure the weight of an object disposed on top if it (e.g., an object resting upon the top surface 633 of at least one top rail 601).

In an embodiment, in order for the load weighing luggage rack to accurately measure the weight of an object, said object may need to be positioned entirely on one or both of the top rails, with none of the weight being supported by a strap or any other structure of the load weighing luggage rack. In an embodiment in which a large piece of luggage is to be weighed, said large piece of luggage may be placed such that it is resting on the top surface 633 of the top platform 630 of each top rail. In alternative embodiment in which a small piece of luggage is being weighed, said small piece of luggage may be placed on and entirely supported by a singular top surface 633 of the top platform 630 of a singular top rail, wherein none of the weight of the small piece of luggage is resting on anything other than said singular top surface 633. In either embodiment, the weight of either piece of luggage may be accurately measured. In an embodiment in which each top rail has a pair of load sensor 604, a small handbag may be placed on top of a first end of the first top rail, therefore allowing a single load sensor to measure the entirety of the weight of said hand bag.

Figure 7:
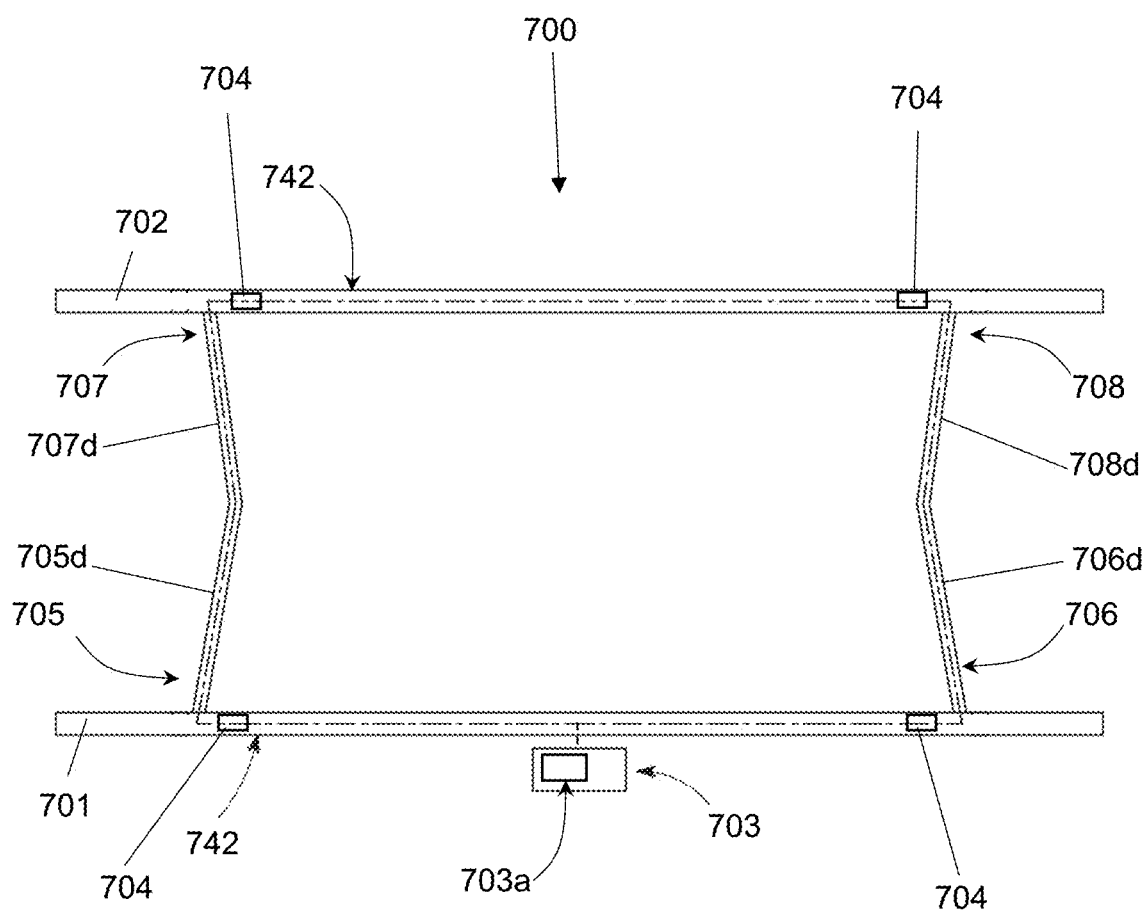
FIG. 7 illustrates the top cross-sectional view of a load weighing luggage rack, according to an aspect.

FIG. 7 illustrates the top cross-sectional view of a load weighing luggage rack 700, according to an aspect. As disclosed hereinabove, a wire chamber 742 may be nested within each corresponding top rail 701, 702 in order to secure a sensor wire, and thus facilitate electrical communication between the strain meter 703 and each load sensor 704 nested within the top rails 701, 702. Depending on the configuration of the first leg 705, second leg 706, third leg 707, and fourth leg 708 of the load weighing luggage 700, it may be beneficial to also provide corresponding wire channels within at least a portion of each leg 705, 706, 707, 708 to suitably protect and conceal the sensor wire within the body of the load weighing luggage rack 700 to prevent damage to the sensor wire during storage and use. In an embodiment, corresponding portions of the sensor wire may be nested within the first top rail 701, the second top rail 702, the first leg 705, the second leg 706, the third leg 707, and the fourth leg 708. In said embodiment, the portion of the sensor wire nested within the first top rail 701 may be in direct electrical communication with the strain meter 703 and its corresponding display.

In an embodiment, two miniature compression load sensors 704 may be built into each top rail 701, 702. Each miniature compression load sensors 704 may be in electrical communication with the digital stain meter 703 as a result of their electrical connection to a sensor wire secured within a wire chamber, wherein a corresponding wire chamber or wire channel is nested within each top rail 701, 702 and leg 705, 706, 707, 708. Each miniature compression load sensor 704 may be wired into a "Wheatstone bridge" configuration with an analog to digital converter ("ADC"), which may be provided as part of the strain meter 703, alongside a load cell amplifier (not shown) as necessary. This embodiment is configured to provide fast, accurate force measurements corresponding to the weight of an object placed on the first top rail 701 and/or the second top rail 702, by measuring small changes in the resistances of the miniature compression load sensors 704. In an embodiment, resultant resistance values from each load sensor 704 may be measured by the strain meter 703 to determine the weight of an object held on at least one of the top rails, wherein said weight is configured to be promptly displayed on a corresponding display 703a of the strain meter 703. The strain meter 703 may be powered by conventional means, including batteries, a connection to a wall outlet, or any other power supply configured to power the strain meter 703 and other interconnected electrical elements, as needed.

It should be understood that at least one load sensor 704 may need to be present within each top rail 701, 702, such that the weight of an object placed on the first top rail 701 and/or second top rail 702 may be accurately measure. In an embodiment, each top rail 701, 702 may have two load sensors 704 (a pair of load sensors), wherein each load sensor is positioned within the middle portion 701c, 702c of a corresponding top rail 701, 702, but toward a first or second end of the corresponding top rail 701, 702, as seen in FIG. 7. In said embodiment, each load sensor 704 may be positioned substantially near to a corresponding leg 705-708 of the load weighing luggage rack.

In order to allow a corresponding portion of the sensor wire to be nested within the legs, appropriate leg wire channels 705d, 706d, 707d, 708d may be utilized. In an embodiment, a first leg wire channel 705d may be nested within the first leg 705, a second leg wire channel 706d may be nested within the second leg 706, a third leg wire channel 707d may be nested within the third leg 707 and a fourth leg wire channel 708d may be nested within the fourth leg 708. In said embodiment, the first wire chamber 742 of the first top rail 701 may be associated with the first leg wire channel 705d and the second leg wire channel 706d, while the second wire chamber 742 of the second top rail 702 may be associated with the third leg wire channel 707d and the fourth leg wire channel 708d. Furthermore, the first leg wire channel 705d may associated with the third leg wire channel 707d, while the second leg wire channel 706d may be in associated with the fourth leg wire channel 708d, thereby forming a continuous, protective housing for the sensor wire to be nested within. As such, each leg wire channel 705d, 706d, 707d, 708d may be configured to securely enclose a corresponding portion of the sensor wire, such that the sensor wire is not crimped or damaged regardless of the configuration load weighing luggage rack.

Figure 8A:
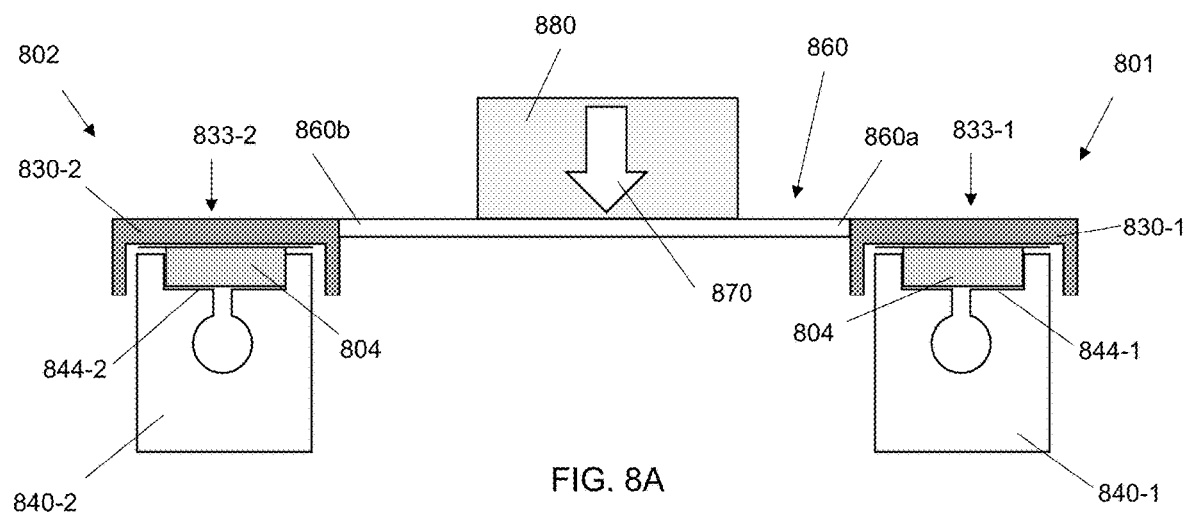
FIG. 8A illustrates the left side cross sectional view of a first and second top rail engaged with a strap, according to an aspect.

FIG. 8A illustrates the left side cross-sectional view of a first and second top rail 801, 802 engaged with a strap 860, according to an aspect. It should be understood that in order to ensure proper function of the load weighing luggage rack, the straps 860 and top rails 801, 802 may be interconnected in a variety of different ways. In an embodiment, the first strap end 860a of a strap 860 may be engaged with the first top platform 830-1 of a first top rail 801, whereas the second strap end 860b of said strap 860 may be engaged with the second top platform 830-2 of the second top rail 802. In such an embodiment, a weight 870 exerted on one or more straps 860 may thusly be exerted on the top platforms 830-1, 830-2 of each top rail 801, 802, similarly to as if an object was disposed on top of the first top surface 833-1 of the first top platform 830-1 and/or the second top surface 833-2 of the second top platform 830-2, thus "pushing" the corresponding top platform(s) 830-1, 830-2 downward. As such, the load sensors 804 seated on top of the first rail base 840-1 of the first top rail 801 and the second rail base 840-2 of the second top rail 802 may be configured to allow the strain meter to determine the weight of a load 880 disposed on the straps 860 of the load weighing luggage rack, without said load 880 resting on top of the top platform 830-1, 830-2 of at least one top rail 801, 802. In said embodiment, the weight of a load 880 may be exerted upon the load sensors 804 regardless of whether said load 880 is disposed on top of the straps 860 and/or one/both of the top rails 801, 802. It should be noted that this mechanism of directly attaching the straps 860 to the top platforms 830-1, 830-2 may only be feasible in embodiment in which the placement of objects on said straps 860 does not cause unintended folding, and thus accidental collapse of the load weighing luggage rack.

As a result of the weight 870 of the package being applied to the to the load sensors from above said load sensors, the weight 870 of the load 880 may be described as "pushing" down on the top rails 801, 802 or more specifically, pushing down on the top platforms 830-1, 830-2 and thus the corresponding sensors 804. This may operate in a similar manner to simply resting an object directly on a top platform 830-1, 830-2 as disclosed hereinabove. Alternative embodiments may alter the mechanism though which said weight/downward force 870 is exerted upon the top platforms 830-1, 830-2, and thus the load sensors 804. In an embodiment, a first sensor cavity 844-1 nested within the first rail base 840-1 may be configured to house a first pair of load sensors 804, whereas a second sensor cavity 844-2 nested within the second rail base 840-2 may be configured to house a second pair of load sensors 804.

Figure 8B:
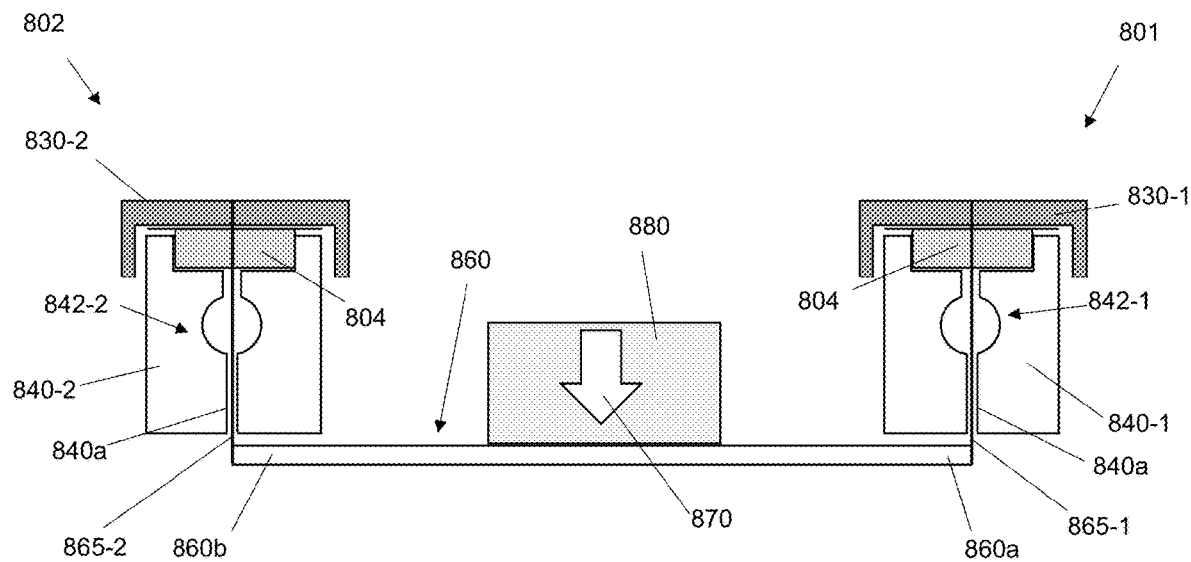
FIG. 8B illustrates the left side cross sectional view of a first and second top rail engaged with a strap using strap supports, according to an aspect.

FIG. 8B illustrates the left side cross-sectional view of a first and second top rail 801, 802 engaged with a strap 860 using strap supports 865-1, 865-2, according to an aspect. In an embodiment, each strap 860 may be secured to a corresponding top platform 830-1, 830-2 by a corresponding strap support 865-1, 865-2, such that each strap end 860a, 860b is suspended from a corresponding top platform 830-1, 830-2 of a corresponding top rail 801, 802. For example, a first strap end 860a may be suspended from the first top platform 830-1 of a first top rail 801 by a corresponding first strap support 865-1 and a second strap end 860b may be suspended from the second top platform 830-2 of a second top rail 802 by a corresponding second strap support 865-2. As such, a load 880 disposed on top of the straps 860 of the load weighing luggage rack may exert a downward force 870 upon said straps 860, wherein said downward force 870 is thusly exerted on the top platforms 830-1, 830-2 of each top rail 801, 802, thereby exerting said downward force 870 upon the load sensors 804 seated on the corresponding first rail base 840-1 and second rail base 840-2 within each top rail 801, 802, accordingly.

In contrast to the previous embodiment of FIG. 8A, the weight 870 of the load 880 in FIG. 8B may be described as "pulling" down on the straps 860, and thus pulling down on the top rails 801, 802, or more specifically, pulling down on the corresponding top platform(s) 830-1, 830-2 and load sensors 804 from below said load sensor 804. The disposition of the load 880 below the top platforms 830-1, 830-2 and load sensors 804 allows the load 880 suspended by the straps 860 to pull down on the top platforms 830-1, 830-2 from below, rather than push down on them from above. In said embodiment, the weight of a load 880 may be exerted upon the load sensors 804 regardless of whether the load 880 is disposed on top of the straps 860 and/or one or both of the top rails 801, 802. Again, it should be noted that this mechanism of directly attaching the straps 860 to the top platforms 830-1, 830-2 may only be feasible in embodiment in which the placement of objects on said straps 860 does not cause unintended folding, and thus accidental collapse of the load weighing luggage rack. In this particular embodiment, the positioning of the top rails 801, 802 above the straps 860 may help to retain a load 880 on top of the load weighing luggage rack, by providing a built in perimeter to prevent items from falling/rolling off of the straps 860, where applicable.

Each strap support 865-1, 865-2 may be nested within a corresponding support channel 840a nested within each rail base 840-1, 840-2, such that each strap support 865-1, 865-2 engages with and is suspended by a corresponding top platform 830-1, 830-2, without engaging or interfering with the load sensors 804. Each strap 860 may be engaged with a corresponding top platform 830-1, 830-2 by one or more strap supports 865-1, 865-2 depending on the needs of the application. Each strap support 865-1, 865-2 may be configured to travel through its own support channel 840a nested with a corresponding rail base 840-1, 840-2, or multiple strap supports 865-1, 865-2 may travel through a larger shared support channel. It should be understood that the strap supports 865-1, 865-2 and their corresponding support channels 840a nested within each rail base 840-1, 840-2 may be suitably positioned as to not interfere with load sensor 804 placement, wherein strap supports 865-1, 865-2 and thus corresponding support channels 840a may be nested within each rail base 840-1, 840-2 between (or sufficiently far away from) the load sensors 804, as applicable. Alternative attachment mechanisms for engaging the strap supports 865-1, 865-2 to the top platforms 830-1, 830-2 may also be utilized, where applicable, such as wrapping a portion of each strap support 865-1, 865-2 around a corresponding top platform 830-1, 830-2, as long as the strap supports 865-1, 865-2 are configured to transfer the downward force 870 exerted on the strap(s) 860 onto said top platforms 830-1, 830-2, and thus the load sensors 804, accordingly.

The support channels 840a nested within the rail bases 840-1, 840-2, may be disposed at fixed distances from each other about the length of the corresponding rail base 840-1, 840-2, such that the presence of said support channels 840a does not result in the bisection of the rail bases 840-1, 840-2. In an embodiment, the presence of strap supports 865-1, 865-2 will not interfere with the electrical interconnections facilitated by the first wire chamber 842-1 nested within the first top rail 801 nor the electrical interconnections facilitated by the second wire chamber 842-2 nested within the second top rail 802. It should be understood that a plurality of strap first strap supports 865-1 and a plurality of second strap supports 865-2 may be utilized in a corresponding embodiment of the load weighing luggage rack, wherein each first strap end 860a is engaged with a corresponding first strap support 865-1 and each second strap end 860b is engaged with a corresponding second strap support 865-2 to suspend each strap 860 from the top rails 801, 802. In an alternative embodiment, the first strap support 865-1 may be a singular continuous structure configured to suspend all first strap ends 860a and the second strap support 865-2 may be a separate, singular continuous structure configured to suspend all second strap ends 860b.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/ or examples. Hence, the scope of the invention is defined by the accompanying claims and their equivalents. Further, each and every claim is incorporated as further disclosure into the specification.

What is claimed is:

1. A load weighing luggage rack comprising:
    a first leg having a first leg top and a first leg middle;
    a second leg having a second leg top and a second leg middle;
    a third leg having a third leg top and a third leg middle;
    a fourth leg having a fourth leg top and a fourth leg middle;
    a first top rail having a first end configured to engage with the first leg top and a second end configured to engage with the second leg top, the first top rail comprising:
        a first pair of load sensors;
        a first rail base configured to engage with the first pair of load sensors, the first rail base comprising:
            a first rail base body having a top portion;
            a first wire chamber nested within the first rail base body, wherein the first wire chamber is configured to securely house a corresponding portion of a sensor wire;
            a first sensor cavity nested within the top portion of the first rail base body, wherein the first sensor cavity is disposed above and associated with the first wire chamber and the first sensor cavity is configured to securely seat the first pair of load sensors, such that each load sensor of the first pair of load sensors is in electrical communication with the sensor wire;
        a first top platform having a first top surface, the first top platform being configured to be seated on and nested around each load sensor of the first pair of load sensors and the top portion of the first rail base body, such that a corresponding weight applied to the first top surface is exerted upon the first pair of load sensors;
    a second top rail having a first end configured to engage with the third leg top and a second end configured to engage with the fourth leg top, the second top rail comprising:
        a second pair of load sensors;
        a second rail base configured to engage with the second pair of load sensors, the second rail base comprising:
            a second rail base body having a top portion;
            a second wire chamber nested within the second rail base body, wherein the second wire chamber is configured to securely house a corresponding portion of the sensor wire;
            a second sensor cavity nested within the top portion of the second rail base body, wherein the second sensor cavity is disposed above and associated with the second wire chamber and the second sensor cavity is configured to securely seat the second pair of load sensors, such that each load sensor of the second pair of load sensors is in electrical communication with the sensor wire;
        a second top platform having a second top surface, the second top platform being configured to be seated on and nested around each load sensor of the second pair of load sensors and the top portion of the second rail base body, such that a corresponding weight applied to the second top surface is exerted upon the second pair of load sensors;
    a strain meter having a display, wherein the strain meter is configured to be attached to the first top rail and in electrical communication with the sensor wire, such that a weight of a load exerted upon at least one of the top rails can be registered by a single load sensor; and a plurality of flexible straps, each flexible strap of the plurality of flexible straps having a first strap end and a second strap end attached to the first strap end, wherein each first strap end is configured to engage with the first top rail, and each second strap end is configured to engage with the second top rail, such that a corresponding weight applied to a flexible strap of the plurality of flexible straps is exerted upon the first top platform and the second top platform and thus the first pair of load sensors and the second pair of load sensors.

2. The load weighing luggage rack of claim 1, further comprising a rear guard configured to be selectively engaged with the second top rail, wherein the rear guard is configured to help secure a load on top of the load weighing luggage rack.

3. The load weighing luggage rack of claim 1, wherein the first leg middle is pivotally engaged with the third leg middle, the second leg middle is pivotally engaged with the fourth leg middle and each flexible strap of the plurality of flexible straps is configured to be folded, such that the load weighing luggage rack is configured to be selectively collapsed by pivoting the first leg about the third leg while simultaneously pivoting the second leg about the fourth leg, thus folding each flexible strap of the plurality of flexible straps and rotating the first top rail toward the second top rail.

4. The load weighing luggage rack of claim 3, further comprising a support arm having a first support end attached to a second support end, wherein the first support end is configured to engage with the first leg and third leg, and the second support end is configured to engage with the second leg and fourth leg, such that the first leg remains pivotally engaged with the third leg and the second leg remains pivotally engaged with the fourth leg.

5. The load weighing luggage rack of claim 1, further comprising a first support arm configured to be attached to the first leg and the third leg, and a second support arm configured to be attached to the second leg and the fourth leg.

6. The load weighing luggage rack of claim 1, wherein each first strap end of each flexible strap is configured to engage with the first top platform and each second strap end of each flexible strap is configured to engage with the second top platform, such that to cause a downward pushing of each top platform when a load is placed on a flexible strap of the plurality of flexible straps.

7. The load weighing luggage rack of claim 1, further comprising a plurality of first strap supports and a plurality of second strap supports, wherein each first strap end of each flexible strap is configured to be suspended from the first top platform by a corresponding first strap support and each second strap end of each flexible strap is configured to be suspended by the second top platform by a corresponding second strap support, such that to cause a downward pulling of each top platform from below each top platform when a load is placed on a flexible strap of the plurality of flexible straps.

8. A load weighing luggage rack comprising:
a first leg;
a second leg;
a third leg;
a fourth leg;
a first top rail configured to engage with the first leg and the second leg, the first top rail comprising:
at least one load sensor;
a first rail base configured to engage with the at least one load sensor of the first top rail, such that the at least one load sensor of the first top rail is seated on the first rail base;
a first top platform having a first top surface, the first top platform being configured to be seated on the at least one load sensor of the first top rail, such that a corresponding weight applied to the first top surface is exerted upon the at least one load sensor of the first top rail;
a second top rail configured to engage with the third leg and the fourth leg, the second top rail comprising:
at least one load sensor;
a second rail base configured to engage with the at least one load sensor of the second top rail, such that the at least one load sensor of the second top rail is seated on the second rail base;
a second top platform having a second top surface, the second top platform being configured to be seated on the at least one load sensor of the second top rail, such that a corresponding weight applied to the second top surface is exerted upon the at least one load sensor of the second top rail;
a sensor wire nested within the first top rail and the second top rail, wherein the sensor wire is configured to be in electrical communication with the at least one load sensor of the first top rail and the at least one load sensor of the second top rail;
a strain meter in electrical communication with the sensor wire, such that a weight of a load exerted upon at least one of the top rails can be registered by a single load sensor; and
a plurality of flexible straps, each flexible strap of the plurality of flexible straps having a first strap end and a second strap end attached to the first strap end, wherein each first strap end is configured to engage with the first top rail, and each second strap end is configured to engage with the second top rail, such that a corresponding weight applied to a flexible strap of the plurality of flexible straps is exerted upon the first top platform and the second top platform and thus the at least one load sensor of the first top rail and the at least one load sensor of the second top rail.

9. The load weighing luggage rack of claim 8, further comprising a rear guard configured to be selectively engaged with the second top rail, wherein the rear guard is configured to help secure a load on top of the load weighing luggage rack.

10. The load weighing luggage rack of claim 8, wherein the first leg is pivotally engaged with the third leg, the second leg is pivotally engaged with the fourth leg and each flexible strap of the plurality of flexible straps is configured to be selectively folded, such that the load weighing luggage rack is configured to be selectively collapsed by rotating each corresponding leg to fold each flexible strap of the plurality of flexible straps, such that the first top rail is moved toward the second top rail.

11. The load weighing luggage rack of claim 10, further comprising a support arm having a first support end attached to a second support end, wherein the first support end is configured to engage with the first leg and third leg, and the second support end is configured to engage with the second leg and fourth leg, such that the first leg remains pivotally engaged with the third leg and the second leg remains pivotally engaged with the fourth leg.

12. The load weighing luggage rack of claim 8, further comprising a first support arm configured to be attached to the first leg and the third leg, and a second support arm configured to be attached to the second leg and the fourth leg, wherein the first leg, second leg, third leg and fourth leg are all parallel with each other and perpendicular to the first top rail and the second top rail.

13. The load weighing luggage rack of claim 8, wherein each first strap end of each flexible strap is configured to engage with the first top platform and each second strap end of each flexible strap is configured to engage with the second top platform, such that to cause a downward pushing of each top platform when a load is placed on a flexible strap of the plurality of flexible straps.

14. The load weighing luggage rack of claim 8, further comprising a plurality of first strap supports and a plurality of second strap supports, wherein each first strap end of each flexible strap is configured to be suspended from the first top platform by a corresponding first strap support and each second strap end of each flexible strap is configured to be suspended by the second top platform by a corresponding second strap support, such that to cause a downward pulling of each top platform from below each top platform when a load is placed on a flexible strap of the plurality of flexible straps.

15. A load weighing luggage rack comprising:
   a first rail support;
   a second rail support;
   a first top rail disposed above and engaged with the first rail support, the first top rail comprising:
      at least one load sensor;
      a first top platform configured to be seated on the at least one load sensor of the first top rail, such that a corresponding weight applied to the first top platform is exerted upon the at least one load sensor of the first top rail;
   a second top rail disposed above and engaged with the second rail support, the second top rail comprising:
      at least one load sensor;
      a second top platform configured to be seated on the at least one load sensor of the second top rail, such that a corresponding weight applied to the second top platform is exerted upon the at least one load sensor of the second top rail;
   a flexible strap configured to engage with the first top rail and the second top rail, such that a corresponding weight applied to the flexible strap is exerted upon the first top platform and the second top platform and thus the at least one load sensor of the first top rail and the at least one load sensor of the second top rail; and
   a strain meter in electrical communication with the at least one load sensor of the first top rail and the at least one load sensor of the second top rail, such that a weight of a load exerted upon at least one of the top rails can be registered by a single load sensor.

16. The load weighing luggage rack of claim 15, further comprising a rear guard configured to be selectively engaged with the second top rail, wherein the rear guard is configured to help secure a load to the load weighing luggage rack.

17. The load weighing luggage rack of claim 15, the flexible strap comprising a first strap end and a second strap end attached to the first strap end, wherein the first strap end is configured to engage with the first top platform and the second strap end is configured to engage with the second top platform, such that to cause a downward pushing of each top platform when a load is placed on the flexible strap.

18. The load weighing luggage rack of claim 15, the flexible strap comprising a first strap end and a second strap end attached to the first strap end, further comprising a first strap support configured to suspend the first strap end from the first top platform and a second strap support configured to suspend the second strap end from the second top platform, such that to cause a downward pulling of each top platform from beneath each top platform when a load is placed on the flexible strap.

19. The load weighing luggage rack of claim 15, wherein the first rail support is configured to engage with the second rail support.

20. The load weighing luggage rack of claim 15, wherein the first rail support is pivotally engaged with the second rail support and the flexible strap is configured to be selectively folded, such that the load weighing luggage rack is configured to be selectively collapsed by pivoting the first rail support about the second rail support such that the flexible strap is folded, and the first top rail is moved toward the second top rail.

\* \* \* \* \*